US005252399A

United States Patent [19]

Hirata et al.

[11] Patent Number: 5,252,399

[45] Date of Patent: Oct. 12, 1993

[54] ALUMINUM MEMBER PROVIDED WITH WEATHER-RESISTANT COAT

[75] Inventors: Seiji Hirata, Kumagaya; Nobuhiko Katagiri, Kohnosu; Ryouji Iijima, Menuma, all of Japan

[73] Assignee: Hitachi Metal Ltd., Tokyo, Japan

[21] Appl. No.: 992,923

[22] Filed: Dec. 18, 1992

[30] Foreign Application Priority Data

| | | | |
|---|---|---|---|
| Dec. 20, 1991 | [JP] | Japan | 3-355992 |
| Dec. 20, 1991 | [JP] | Japan | 3-356010 |
| Dec. 20, 1991 | [JP] | Japan | 3-356013 |

[51] Int. Cl.[5] ........................ B32B 15/08; B32B 27/38; B32B 27/36; B32B 27/08

[52] U.S. Cl. .................................... 428/416; 428/458; 428/482; 428/515; 428/520; 524/902; 524/904

[58] Field of Search ............... 428/416, 458, 482, 515, 428/520; 524/902, 904

[56] References Cited

U.S. PATENT DOCUMENTS

| | | | |
|---|---|---|---|
| 3,136,653 | 6/1964 | Swanson | 428/458 |
| 4,129,488 | 12/1978 | McGinniss | 524/902 |
| 4,147,737 | 4/1979 | Sein et al. | 524/904 |
| 4,208,223 | 6/1980 | Hofstatter | 428/447 |
| 4,346,144 | 7/1982 | Craven | 524/904 |
| 4,359,504 | 11/1982 | Troy | 428/482 |
| 4,911,954 | 3/1990 | Tatsuno et al. | 428/458 |
| 5,034,262 | 7/1991 | Komatsu et al. | 428/447 |

FOREIGN PATENT DOCUMENTS

| | | | |
|---|---|---|---|
| 0083449 | 5/1982 | Japan | 528/416 |

*Primary Examiner*—Paul R. Michl
*Assistant Examiner*—Peter Szekely
*Attorney, Agent, or Firm*—Thomas R. Morrison

[57] ABSTRACT

An aluminum member provided with a weather-resistant coat having good corrosion resistance, weather resistance, paintability, etc., the coat having (a) a primer layer of an epoxy polyester-based, hybrid powder coating composition formed on an aluminum member; (b) a base coat layer of a metallic acrylic coating composition formed on the primer layer; and (c) a barrier coat layer of a high solid-type, clear, acrylic coating composition formed on the base coat layer.

19 Claims, No Drawings

ALUMINUM MEMBER PROVIDED WITH WEATHER-RESISTANT COAT

BACKGROUND OF THE INVENTION

The present invention relates to a weather-resistant coat formed on members made of aluminum or aluminum alloys such as car wheels, and to an aluminum member provided with such a weather-resistant coat.

Car wheels are conventionally produced by steel, but in order to reduce the weight of the automobiles, or to improve their appearances or designs, increasingly more attention has been paid to aluminum wheels. In general, aluminum wheels are coated with compositions for improving their weather resistance and corrosion resistance.

Weather-resistant coatings of aluminum wheels can be made in many ways, and they have conventionally been produced by so-called organic solvent-type coating compositions in order to improve the smoothness and clearness of the wheel surfaces. However, because of the increasing attention towards environmental problems, regulation of organic solvents' emision has become strict. Accordingly, it has become difficult to use the conventional organic solvent-type coating compositions.

Under these circumstances, powder coating for aluminum wheels has attracted much attention, especially in the United States where it became the leading method. In the United States, powders of polyester resins such as triglycidyl isocyanurate-based polyesters are widely used. Recently, there has been increasingly higher demand on coatings for aluminum wheels having better corrosion resistance. Weather resistance and paintability have also become desirable, but the above polyester-based powder coating fails to satisfy such demands.

In particular, so-called metallic coating tends to discolor, since it contains fine aluminum powder. In addition, the metallic coating shows poorer weather resistance than solid color coating. In view of these facts, a metallic coating composition for aluminum members having good weather resistance is demanded.

OBJECTS AND SUMMARY OF THE INVENTION

Accordingly, an object of the present invention is to provide a metallic coat having good corrosion resistance, weather resistance and paintability, formed on an aluminum member without using an organic solvent-type coating composition.

Another object of the present invention is to provide an aluminum member provided with the metallic coat having good corrosion resistance, weather resistance and paintability.

As a result of intense research in view of the above objects, the inventors have found that the above objects can be achieved by forming a primer layer made of an epoxy polyesterbased, hybrid powder coating composition, a base coat layer made of a metallic, acrylic coating composition or an aqueous, metallic alkyd coating composition and then a barrier coat layer made of a clear, acrylic coating composition or a clear, acrylic powder coating composition on an aluminum member. The inventors have further found that more effects can be achieved by forming a topcoat layer of a clear powder coating composition based on a glycidyl group-containing polyester between the base coat layer and the barrier coat layer. The present invention has been made based on these findings.

Thus, the weather-resistant coat formed on an aluminum member according to the first embodiment of the present invention comprises:

(a) a primer layer of an epoxy polyester-based, hybrid powder coating composition formed on an aluminum member;

(b) a base coat layer of a metallic, acrylic coating composition formed on the primer layer; and (c) a barrier coat layer of a clear, acrylic coating composition formed on the base coat layer.

The weather-resistant coat formed on an aluminum member according to the second embodiment of the present invention comprises:

(a) a primer layer of an epoxy polyester-based, hybrid powder coating composition formed on an aluminum member;

(b) a base coat layer of metallic, acrylic coating composition formed on the primer layer; and (c) a barrier coat layer of a clear, acrylic powder coating composition formed on the base coat layer.

The weather-resistant coat-formed on an aluminum member according to the third embodiment of the present invention comprises:

(a) a primer layer of an epoxy polyester-based, hybrid powder coating composition formed on an aluminum member;

(b) a base coat layer of an aqueous, metallic alkyd coating composition formed on the primer layer;

(c) a topcoat layer of a clear powder coating composition based on a glycidyl group-containing polyester, formed on the base coat layer; and (d) a barrier coat layer of a clear, acrylic coating composition formed on the topcoat layer.

The weather-resistant coat formed on an aluminum member according to the fourth embodiment of the present invention comprises:

(a) a primer layer of an epoxy polyester-based, hybrid powder coating composition formed on an aluminum member;

(b) a base coat layer of a metallic, acrylic coating composition formed on the primer layer;

(c) a topcoat layer of a clear powder coating composition based on a glycidyl group-containing polyester, formed on the base coat layer; and (d) a barrier coat layer of a clear, acrylic coating composition formed on the topcoat layer.

DETAILED DESCRIPTION OF THE PREFERRED EMBODIMENTS

[A] First Embodiment

[1] Formation of Underlayer

Before applying the weather-resistant coat of the present invention to the aluminum member, the aluminum member is subjected to alkali degreasing and chemical treatment. As for the chemical treatment, a chromate treatment is preferred. The chromate treatment can be done by using an aqueous solution of chronic acid and an inorganic acid such as sulfuric acid, nitric acid, hydrofluoric acid, phosphoric acid, etc. in addition to a suitable additive.

The chromate treatment method can be classified into two groups: The first method is a phosphoric acid chromate treatment method, which uses phosphoric acid as an inorganic acid. The second method is a chromium chromate treatment method, in which acid, other than phosphoric acid is used. Either process can be done by immersing the aluminum member in the chromate treatment solution or by spraying the treatment solution onto the aluminum member. A chemical conversion coating which can be obtained by the chromate treatment is generally 3 mg/m$^2$ or more, and preferably 5-20 mg/m$^2$.

After forming the chemical conversion coating, the aluminum member is rinsed preferably with deionized water.

[2] Primer Layer

An epoxy polyester-based, hybrid powder coating composition is used for the primer layer. Specific examples of the epoxy polyester-based, hybrid powder coating composition are preferably IF2506 of H. B. Fuller, etc. The term "hybrid" used herein means that an epoxy and a polyester are contained in the powder coating composition.

Powder coating for the primer layer is applied to the aluminum member by an electrostatic coating method. The epoxy polyester-based, hybrid powder coating composition applied to the aluminum member is baked at 150°-200° C. for 10-40 minutes. Thickness of the primer layer obtained by said method will be about 20-40 μm in general.

[3] Base Coat Layer

The coating composition for forming the base coat layer, metallic, acrylic coating composition based on a curable acrylic resin containing a melamine as a cross-linking agent. The metallic, acrylic coating composition has a solid component concentration of about 40-50% by weight, and is baked at about 120°-180° C., particularly at 120°-140° C.

The base coat layer preferably has a thickness within the range of about 10-30 μm. Incidentally, fine aluminum powder contained in the coating composition for the base coat layer is preferably in a flaky shape having a diameter of about 5-15 μm.

[4] Barrier Coat Layer

The barrier coat layer formed on the base coat layer is formed from a high solid-type, clear, acrylic coating composition based on curable acrylic resins containing epoxy compounds, melamines, urethanes, etc. as cross-linking agents. The clear, acrylic coating composition has a solid component concentration of about 40-50% by weight, and is baked at 130°-180° C. for 10-40 minutes.

The barrier coat layer thus obtained has a thickness of about 20-50 μm. If the thickness of the barrier coat is less than 20 μm, the coating would be susceptible to softening and spots in an acid resistance test.

In order to improve the adhesion and coating properties, the clear barrier coat layer made of the high solid-type, clear, acrylic coating composition should show a relatively low degree of hardness after setting. The preferred hardness of the barrier coat is more than F according to a pencil hardness test, and the more preferred hardness is within the range of about 1H-3H. If the degree of hardness is lower than F, the scuff (mar) resistance of the barrier coat layer is not strong enough. On the other hand, if the degree of hardness is higher than 3H, the barrier coat layer would show poor coating properties.

[5] Total Thickness

The total thickness of the weather-resistant coat constituted by the above layers is about 60-120 μm. If the total thickness of the weather-resistant coat is less than 60 μm, the weather-resistant coat is not sufficiently uniform and shows poor corrosion resistance. However, the properties will not be any better if the thickness of the weather-resistant coat is over 120 μm.

[B] Second Embodiment

The layer structure of the weather-resistant coat and the method of forming it according to the second embodiment of the present invention are the same as in the first embodiment with the exception that the barrier coat layer formed on the base coat layer is formed from a clear, acrylic powder coating composition.

[1] Barrier Coat Layer

The barrier coat layer formed on the base coat layer is formed from a clear, acrylic powder coating composition based on curable acrylic resins. The curable acrylic resins usable in the present invention are glycidyl acrylate resins such as glycidyl acrylate, glycidyl methacrylate, β-methylglycidyl acrylate, β-methylglycidyl methacrylate, triglycidyl isocyanurate acrylate, etc.

The barrier coat is formed by an electrostatic powder coating method. The barrier coat formed from the clear, acrylic powder coating composition is baked at 140°-180° C. for 15-60 minutes. The barrier coat layer thus obtained has a thickness of about 30-50 μm.

In order to improve the adhesion and coating properties, the barrier coat layer made of clear, acrylic powder coating composition should show a relatively low degree of hardness after setting. The preferred hardness of the barrier coat is more than F according to a pencil hardness test, and the more preferred hardness is within the range of about 1H-3H. If the degree of hardness is lower than F, the scuff (mar) resistance of the barrier coat layer is not strong enough. On the other hand, if the degree of hardness is higher than 3H, the barrier coat layer would show poor coating properties.

[2] Other Layers

The primer layer and the base coat layer in this embodiment may be the same as in the first embodiment.

[3] Total Thickness

The total thickness of this embodiment is the same as in the first embodiment.

[C] Third Embodiment

The layer structure of the weather-resistant coat according to the third embodiment of the present invention is the same as in the first embodiment of the present invention with the exception that the base coat layer is formed from an aqueous, metallic, alkyd coating composition, and that a topcoat layer of a clear powder coating composition based on glycidyl group-containing polyester is formed between the base coat layer and the barrier coat layer.

[1] Primer Layer

Depending on the type of the base coat to be applied to the primer layer, the primer layer can preferably be sandpapered. Particularly, if the base coat layer is formed from an aqueous, metallic, alkyd coating composition, the primer layer should be sandpapered. On the other hand, if the base coat layer is formed from a high solid-type, acrylic coating composition, the sandpapering is not needed.

[2] Base Coat Layer

The coating composition for forming the base coat layer is an aqueous, metallic alkyd coating composition. There are various types of aqueous, alkyd coating compositions; amino-alkyd base, acrylic alkyd base, styrene alkyd base, etc. In general, the aqueous, metallic alkyd coating composition has a solid component concentration of about 20–40% by weight, and is baked at about 170°–190° C., for 10–40 minutes.

The base coat layer preferably has a thickness within the range of about 10–30 μm. Incidentally, fine aluminum powder contained in the coating composition for the base coat layer is preferably in a flaky shape having a diameter of about 5–15 μm.

[3] Topcoat Layer

A clear coating composition for the topcoat layer applied to the base coat layer is a powder coating composition based on a glycidyl group-containing polyester such as a triglycidyl isocyanurate (TGIC) polyester.

The topcoat is formed by an electrostatic powder coating method. The topcoat formed from the clear powder coating composition based on a glycidyl group-containing polyester on the base coat layer is baked at 160°–200° C. for 10–50 minutes. The topcoat layer thus obtained has a thickness of about 30–50 μm.

[4] Barrier Coat Layer

The barrier coat layer in this embodiment may be the same as in the first embodiment.

[5] Total Thickness

The total thickness of the weather-resistant coat constituted by the above layers is about 80–170 μm. If the total thickness of the weather-resistant coat is less than 80 μm, the weather-resistant coat is not sufficiently uniform and shows poor corrosion resistance. On the other hand, if the thickness of the weather-resistant coat is over 170 μm, the adhesion of the weather-resistant coat to the aluminum member would be poor.

[D] Fourth Embodiment

The layer structure of the weather-resistant coat and the method of forming it according to the fourth embodiment of the present invention are the same as in the third embodiment of the present invention with the exception that a base coat layer is formed from a high solid-type, metallic acrylic coating composition.

[1] Base Coat Layer

The base coat layer in this embodiment may be the same as in the first embodiment. That is, the coating composition for forming the base coat layer is a metallic, acrylic coating composition based on a curable acrylic resin containing a melamine as a crosslinking agent. The metallic, acrylic coating composition has a solid component concentration of about 40–50% by weight, and is baked at about 120°–180° C., particularly at 120°–140° C.

The base coat layer preferably has a thickness within the range of about 10–30 μm. Incidentally, fine aluminum powder contained in the coating composition for the base coat layer is preferably in a flaky shape having a diameter of about 5–15 μm.

[2] Other Layers

The primer layer, the topcoat layer and the barrier coat layer in this embodiment may be the same as in the third embodiment.

[3] Total Thickness

The total thickness of this embodiment is the same as in the third-embodiment.

In sum, the weather-resistant coats according to the first to fourth embodiments have the following layer structures:

| | |
|---|---|
| | First Embodiment |
| Primer Layer | Epoxy polyester-based, hybrid powder coating composition |
| Base Coat Layer | metallic, acrylic coating composition |
| Barrier Coat Layer | clear, acrylic coating composition |
| | Second Embodiment |
| Primer Layer | Epoxy polyester-based, hybrid powder coating composition |
| Base Coat Layer | metallic, acrylic coating composition |
| Barrier Coat Layer | Clear, acrylic powder coating composition |
| | Third Embodiment |
| Primer Layer | Epoxy polyester-based, hybrid powder coating composition |
| Base Coat Layer | Aqueous, metallic alkyd coating composition |
| Topcoat Layer | Clear powder coating composition base on a glycidyl group-containing polyester |
| Barrier Coat Layer | clear, acrylic coating composition |
| | Fourth Embodiment |
| Primer Layer | Epoxy polyester-based, hybrid powder coating composition |
| Base Coat Layer | metallic, acrylic coating composition |
| Topcoat Layer | Clear powder coating composition based on a glycidyl group-containing polyester |
| Barrier Coat Layer | clear, acrylic coating composition |

The present invention will be explained in further detail below.

EXAMPLE 1

An aluminum plate (125 mm×75 mm×0.7 mm) was first degreased with alkali, rinsed with water, treated with a chromium chromate solution (chemical coating thickness: 5–20 mg/m$^2$), rinsed again with pure water, and then dried. Thereafter, an epoxy polyester-based, hybrid powder coating composition (IF2506, produced by H. B. Fuller) was applied to the aluminum plate, and baked at 190° C. for 10 minutes to form a primer layer having thickness of 40 μm. Thereafter, without sandpapering the primer layer, a high solid-type, metallic, acrylic coating composition (W48848, produced by PPG) containing fine aluminum powder having average diameter of 10 μm, and a solid content of 50 weight % was applied and baked at 140° C. for 20 minutes to produce a base coat layer having a thickness of 20 μm. Furthermore, a high solid-type, clear acrylic coating composition (W48970, produced by PPG) having a content of 50 weight % was applied and baked at 170° C. for 30 minutes to produce a barrier coat layer having a thickness of 40 μm. The resultant weather-resistant coat had a total thickness of 100 μm and a layer structure shown in Table 1.

Each test piece of the aluminum plate provided with the weather-resistant coat was subjected to the following tests:

(1) Pencil Hardness Test

The coat of each test piece was scratched with pencils having various levels of hardness to measure its hardness.

(2) Thickness Test

In each test piece, the thickness of the coat was measured by a high-frequency thickness gage.

(3) Paint Adhesion Test (Cross Cut Adhesion Test)

In each test piece, a surface of the coat was cross-out by a knife in a checkerboard pattern to have 100 separate square areas of 1 mm×1 mm. A cellophane tape was adhered onto the test piece and then peeled off. The number of remaining square areas was counted to evaluate the adhesion.

(4) Warm Water Immersion Test

Each test piece was immersed in a warm water at 60° C. for 72 hours, and then left to stand for 24 hours. Thereafter, the test pieces were subjected to the same cross cut adhesion test as in test (3).

(5) Salt Spray Test

In each test piece, a surface of the coat was cross-cut by a knife, and sprayed with an aqueous solution containing 5 weight % of NaCl at 35° C. for 1200 hours. After the test pieces were left to stand for 24 hours, observation was conducted by the naked eye to see how much corrosion took place in areas within 2 mm from cross-cut lines. The corrosion was evaluated by the following standards:

○ No defects.

X Blistered or rusted.

(6) Weather Resistance Test

The test pieces were subjected to exposure for 600 hours by a Sunshine Weatherometer. Thereafter, the test pieces were retained under the conditions of a temperature of 50° C. and a relative humidity of 98% for 240 hours. After the test pieces were left to stand for 24 hours, they were subjected to a cross cut adhesion test (100 separate square areas of 1 mm×1 mm) to observe peeling and discoloration by the naked eye. The evaluation was conducted according to the following standards:

○ No peeling and discoloration.

X Peeling and/or discoloration was found.

(7) Filiform Corrosion Test

Each test piece was cross-cut and subjected to a salt spray test by repeating 3 cycles each consisting of (a) spraying with a 5-weight-% NaCl aqueous solution at 35° C. for 24 hours and (b) leaving at 40° C. and at a relative humidity of 82% for 240 hours (total 792 hours). After this treatment, the test pieces were observed with respect to the filiform corrosion in the same manner as in test (5). The evaluation of the filiform corrosion was conducted according to the following standards:

○ The length of filiform corrosion was within 2 mm.

X The length of filiform corrosion was over 2 mm.

(8) Multiple Corrosion Test

Each test piece was subjected to 100 cycles of treatment, each of which consisted of (a) the same salt spray test as in test (5) for 4 hours, (b) drying at 60° C. for 2 hours, and (c) leaving at 50° C. and at a relative humidity of 95% for 2 hours (total 800 hours). The evaluation of the multiple corrosion was conducted according to the following standards:

○ No defects were found.

X Blisters and/or rust was found on the surface or edge, or blisters and/or rust over 2 mm was found in the cross cut areas.

(9) Heat Cycle Test

The test pieces were subjected to a heat cycle test by repeating 2 cycles each consisting of (a) heating at 90° C. for 4 hours, (b) cooling at −40° C. for 1.5 hours, (c) heating at 70° C. and at a relative humidity of 95% for 3 hours, and (d) cooling at −40° C. for 1.5 hours. Thereafter, the test pieces were left to stand for 24 hours, and then subjected to a cross cut adhesion test. The evaluation was conducted by the following standards:

○ No defects were found.

X Remarkable deterioration was found, or the number of the remaining square areas was less than 80/100.

(10) Impact Resistance Test

Immediately after keeping each test piece at −40° C., a 500-g weight was dropped onto the test piece from 30 cm above. The test pieces were then observed by the naked eye with respect to defects such as cracking and peeling, and were evaluated according to the following standards:

○ No defects.

X Cracked or peeled.

(11) Alkali Resistance Test

After an aqueous solution of 5 weight % of NaOH was dropped onto each test piece, the test piece was left to stand for 4 hours at a room temperature. The evaluation was conducted by the following standards:

○ No defects.

X Defects such as discoloration, spotting, blistering and softening were found.

(12) Acid Resistance Test

After an aqueous solution of 10 weight % of $H_2SO_4$ was dropped onto each test piece, the test piece was left to stand at a room temperature for 24 hours. The evaluation was conducted by the following standards:

○ No defects.

X Defects such as discoloration, spotting, blistering and softening were found.

The results of tests (1)-(12) are shown in Table 2.

COMPARATIVE EXAMPLE 1

An aluminum plate provided with the same underlayer as in Example 1 was coated with an epoxy-based, powder coating composition (153E136, produced by Glidden) to form a primer layer, and a high-solid, metallic, acrylic coating composition (W48848, produced by PPG) to form a base coat layer, and then baked at 140° C. for 20 minutes. Thereafter, a clear, acrylic powder coating composition (PC10103, produced by PPG) was applied by an electrostatic coating method and baked at 170° C. for 20 minutes to form a barrier coat layer. The layer structure of the resultant weather-resistant coat is shown in Table 1.

Each test piece was subjected to the tests (1)-(12), and the results are shown in Table 2.

COMPARATIVE EXAMPLE 2

A weather-resistant coat was formed on an aluminum plate in the same manner as in Example 1 with the exception that an aqueous, metallic alkyd coating composition (WPB-3813-1, produced by Sprayrat) was applied to form the base coat layer, and that a triglycidyl isocyanurate polyester-based, clear powder coating composition (6C-105, produced by Glidden) was applied to form the barrier coat layer. The layer structure of the coating obtained by this process is shown in Table 1.

Each test piece was subjected to the tests (1)-(12), and the results are shown in Table 2.

COMPARATIVE EXAMPLE 3

A weather-resistant coat was formed on an aluminum plate in the same manner as in Comparative Example 2 with the exception that a triglycidyl isocyanurate polyester-based, clear powder coating composition (VP-184, produced by Fero) was applied to form the barrier coat layer. The layer structure of the coating obtained by this process is shown in Table 1.

Each test piece was subjected to the tests (1)-(12), and the results are shown in Table 2.

COMPARATIVE EXAMPLE 4

A weather-resistant coat was formed on an aluminum plate in the same manner as in Comparative Example 3 with the exception that a high-solid, clear acrylic coating composition (W48970, produced by PPG) was applied to form the barrier coat layer. The layer structure of the coating obtained by this process is shown in Table 1.

Each test piece was subjected to the tests (1)-(12), and the results are shown in Table 2.

EXAMPLE 2

A weather-resistant coat was formed on an aluminum plate in the same manner as in Example 1 with the exception that a clear, acrylic powder coating composition (PC10103, produced by PPG) was applied by an electrostatic coating method, and baked at 170° C. for 20 minutes to form the barrier coat layer. The layer structure of the coating obtained by this process is shown in Table 1.

Each test piece was subjected to the tests (1)-(2), and the results are shown in Table 3.

EXAMPLE 3

An aluminum plate (125 mm×75 mm×0.7 mm) was first degreased with alkali, rinsed with water, treated with a chromium chromate solution (chemical coating thickness: 5-20 mg/m$^2$), rinsed again with pure water, and then dried. Thereafter, an epoxy polyester-based, hybrid powder coating composition (IF2506, produced by H. B. Fuller) was applied to the aluminum plate, and baked at 190° C. for 10 minutes to form a primer layer having a thickness of 40 μm. After sandpapering the primer layer, an aqueous, metallic, alkyd coating composition (WPB-3813-1, produced by Sprayrat) containing fine aluminum powder having an average diameter of 10 μm was applied and baked at 170° C. for 30 minutes to produce a base coat layer having a thickness of 20 μm.

Furthermore, a triglycidyl isocyanurate (TGIC) polyester-based, clear powder coating composition (6C-105, produced by Glidden) was applied to the base coat layer by an electrostatic coating method, and then baked at 170° C. for 30 minutes to form a topcoat layer having a thickness of 40 μm. Thereafter, a clear acrylic coating composition (W48970, produced by PPG) was applied to the topcoat layer, and then baked at 170° C. for 30 minutes to form a barrier coat layer having a thickness of 30 μm.

The resultant weather-resistant coat had a total thickness of 130 μm and a layer structure shown in Table 1.

Each test piece was subjected to the tests (1)-(12), and the results are shown in Table 3.

EXAMPLE 4

A weather-resistant coat was formed on an aluminum plate in the same manner as in Example 3 but without sandpapering the primer layer, a metallic acrylic coating composition (W48848, produced by PPG) containing fine aluminum powder having an average diameter of 10 μm and having a solid content of 50 weight % was applied to the primer layer, and then baked at 140° C. for 20 minutes to form a base coat layer having a thickness of 20 μm. The layer structure of the coating obtained by this process is shown in Table 1. The resultant weather-resistant coat had a total thickness of 130 μm, and a layer structure shown in Table 1.

Each test piece was subjected to the tests (1)-(12), and the results are shown in Table 3.

TABLE 1

| | |
|---|---|
| | Example 1 |
| Primer Layer | Epoxy polyester-based, hybrid powder coating composition(1) |
| Base Coat Layer | metallic, acrylic coating composition(2) |
| Barrier Coat Layer | clear, acrylic coating composition(3) |
| | Comparative Example 1 |
| Primer Layer | Epoxy-based, powder coating composition(4) |
| Base Coat Layer | metallic, acrylic coating composition(2) |
| Barrier Coat Layer | Clear, acrylic powder coating composition(5) |
| | Comparative Example 2 |
| Primer Layer | Epoxy polyester-based, hybrid powder coating composition(1) |
| Base Coat Layer | Aqueous, metallic alkyd coating composition(6) |
| Barrier Coat Layer | Triglycidyl isocyanurate polyester-based, clear powder coating composition(7) |
| | Comparative Example 3 |
| Primer Layer | Epoxy polyester-based, hybrid powder coating composition(1) |
| Base Coat Layer | Aqueous, metallic alkyd coating composition(6) |
| Barrier Coat Layer | Triglycidyl isocyanurate polyester-based, clear powder coating composition(8) |
| | Comparative Example 4 |
| Primer Layer | Epoxy polyester-based, hybrid powder coating composition(1) |
| Base Coat Layer | Aqueous, metallic alkyd coating composition(6) |
| Barrier Coat Layer | clear, acrylic coating composition(3) |
| | Example 2 |
| Primer Layer | Epoxy polyester-based, hybrid powder coating composition(1) |
| Base Coat Layer | metallic acrylic coating composition(2) |
| Barrier Coat Layer | Clear, acrylic powder coating composition(5) |
| | Example 3 |
| Primer Layer | Epoxy polyester-based, hybrid powder coating composition(1) |
| Base Coat Layer | Aqueous, metallic alkyd coating composition(6) |
| Topcoat Layer | Triglycidyl isocyanurate (TGIC) polyester-based, clear powder coating composition(7) |
| Barrier Coat Layer | clear, acrylic coating composition(3) |
| | Example 4 |
| Primer Layer | Epoxy polyester-based, hybrid powder coating composition(1) |
| Base Coat Layer | metallic, acrylic coating composition(2) |
| Topcoat Layer | Triglycidyl isocyanurate polyester-based, clear powder coating composition(7) |
| Barrier Coat Layer | clear, acrylic coating |

TABLE 1-continued

| |
|---|
| composition[3] |

Notes:
(1) IF2506, produced by H. B. Fuller.
(2) W48848, produced by PPG.
(3) W48970, produced by PPG.
(4) 153E136, produced by Glidden.
(5) PC10103, produced by PPG.
(6) WPB-3813-1, produced by Sprayrat.
(7) 6C-105, produced by Glidden.
(8) VP-184, produced by Fero.

TABLE 2

| Test Item | Example 1 | Comp. Ex. 1 | Comp. Ex. 2 | Comp. Ex. 3 | Comp. Ex. 4 |
|---|---|---|---|---|---|
| (1) Pencil Hardness | 2H | H | H | H | H |
| (2) Thickness (μm) | 90–110 | 85–120 | 100–130 | 99–160 | 105–124 |
| (3) Adhesion | 100/100 | 100/100 | 100/100 | 100/100 | 100/100 |
| (4) Immersion in Hot Water | 100/100 | 10/100 | 100/100 | 100/100 | 100/100 |
| (5) Salt Spray Test | ○ | x | ○ | ○ | x |
| (6) Weather Resistance | 100/100 | 2/100 | 39/100 | 52/100 | 100/100 |
| | ○ | ○ | x | x | ○ |
| (7) Filiform Corrosion | ○ | ○ | ○ | ○ | ○ |
| (8) Multiple Corrosion | ○ | ○ | ○ | ○ | ○ |
| (9) Heat Cycle | 100/100 | 100/100 | 100/100 | 100/100 | 100/100 |
| | ○ | ○ | ○ | x | ○ |
| (10) Shock Resistance | — | ○ | ○ | ○ | x |
| (11) Alkali Resistance | ○ | ○ | ○ | ○ | ○ |
| (12) Acid Resistance | ○ | ○ | ○ | ○ | ○ |

TABLE 3

| Test Item | Example 2 | Example 3 | Example 4 |
|---|---|---|---|
| (1) Pencil Hardness | H | H | H |
| (2) Thickness (μm) | 68–92 | 120–140 | 120–140 |
| (3) Adhesion | 100/100 | 100/100 | 100/100 |
| (4) Immersion in Hot Water | 100/100 | 100/100 | 100/100 |
| (5) Salt Spray Test | ○ | ○ | ○ |
| (6) Weather Resistance | 100/100 | 100/100 | 100/100 |
| | ○ | ○ | ○ |
| (7) Filiform Corrosion | ○ | ○ | ○ |
| (8) Multiple Corrosion | ○ | ○ | ○ |
| (9) Heat Cycle | 100/100 | 100/100 | 100/100 |
| | ○ | ○ | ○ |
| (10) Shock Resistance | ○ | ○ | ○ |
| (11) Alkali Resistance | ○ | ○ | ○ |
| (12) Acid Resistance | ○ | ○ | ○ |

As described above in detail, the weather-resistant coat formed on an aluminum member according to the present invention has good corrosion resistance, weather resistance, paintability, etc. Having such features, the weather-resistant coat of the present invention is suitable for aluminum wheels for automobiles.

What is claimed is:

1. A weather-resistant coat formed on an aluminum member comprising:
(a) a primer layer of an epoxy polyester-based, hybrid powder coating composition formed on an aluminum member;
(b) a base coat layer of a, metallic, acrylic coating composition formed on said primer layer; and
(c) a barrier coat layer of a high solid-type, clear, acrylic coating composition formed on said base coat layer.

2. The weather-resistant coat formed on an aluminum member according to claim 1, wherein said, metallic, acrylic coating composition for said base coat layer is based on an acrylic melamine resin.

3. The weather-resistant coat formed on an aluminum member according to claim 1, wherein said clear, acrylic coating composition for said barrier coat layer is based on an acrylic melamine resin.

4. An aluminum member coated with a weather-resistant coat according to claim 1.

5. A weather-resistant coat formed on an aluminum member comprising:
(a) a primer layer of an epoxy polyester-based, hybrid powder coating composition formed on an aluminum member;
(b) a base coat layer of a metallic, acrylic coating composition formed on said primer layer; and
(c) a barrier coat layer of a clear, acrylic powder coating composition formed on said base coat layer.

6. The weather-resistant coat formed on an aluminum member according to claim 5, wherein said clear, acrylic powder coating composition for said barrier coat layer is based on a glycidyl acrylate resin.

7. An aluminum member coated with a weather-resistant coat according to claim 5.

8. A weather-resistant coat formed on an aluminum member comprising:
(a) a primer layer of an epoxy polyester-based, hybrid powder coating composition formed on an aluminum member;
(b) a base coat layer of an aqueous, metallic alkyd coating composition formed on said primer layer;
(c) a topcoat layer of a clear powder coating composition based on a glycidyl group-containing polyester, formed on said base coat layer; and
(d) a barrier coat layer of a clear, acrylic coating composition formed on said topcoat layer.

9. The weather-resistant coat formed on an aluminum member according to claim 8, wherein said base coat layer is formed after said primer layer is sandpapered.

10. The weather-resistant coat formed on an aluminum member according to claim 8, wherein said clear powder coating composition based on a glycidyl group-containing polyester for said topcoat layer is a triglycidyl isocyanurate polyester-based, clear powder coating composition.

11. The weather-resistant coat formed on an aluminum member according to claim 8, wherein clear, acrylic coating composition for said barrier coat layer is based on an acrylic melamine resin.

12. An aluminum member coated with a weather-resistant coat according to claim 8.

13. A weather-resistant coat formed on an aluminum member comprising:
(a) a primer layer of an epoxy polyester-based, hybrid powder coating composition formed on an aluminum member;
(b) a base coat layer of a metallic, acrylic coating composition formed on said primer layer;

(c) a topcoat layer of a clear powder coating composition based on a glycidyl group-containing polyester, formed on said base coat layer; and (d) a barrier coat layer of a clear, acrylic coating composition formed on said topcoat layer.

14. The weather-resistant coat formed on an aluminum member according to claim 13, wherein said base coat layer is formed on said primer layer without sandpapering.

15. The weather-resistant coat formed on an aluminum member according to claim 13, wherein said clear powder coating composition based on a glycidyl group-containing polyester for said topcoat layer is a triglycidyl isocyanurate polyester-based, clear powder coating composition.

16. The weather-resistant coat formed on an aluminum member according to claim 13, wherein clear, acrylic coating composition for said barrier coat layer is based on an acrylic melamine resin.

17. An aluminum member coated with a weather-resistant coat according to claim 13.

18. A method of making a protective coating comprising the steps of:

coating a primer layer of an epoxy polyester-based, hybrid powder coating composition on a surface;

coating a base coat layer of a high solid type, metallic, acrylic coating composition on said primer layer; and coating a barrier coat layer of a high solid-type, clear, acrylic coating composition on said base coat layer.

19. A method according to claim 18, further comprising the step of:

coating a top coat layer of a clear powder coating composition based on a glycidyl group-containing polyester between said base coat layer and said barrier coat layer.

* * * * *